(12) United States Patent
Kroepfl et al.

(10) Patent No.: US 9,091,755 B2
(45) Date of Patent: Jul. 28, 2015

(54) THREE DIMENSIONAL IMAGE CAPTURE SYSTEM FOR IMAGING BUILDING FACADES USING A DIGITAL CAMERA, NEAR-INFRARED CAMERA, AND LASER RANGE FINDER

(75) Inventors: Michael Kroepfl, Redmond, WA (US); Michael Gruber, Graz (AT); Martin Josef Ponticelli, Graz (AT); Stephen Lawler, Kirkland, WA (US); Joachim Bauer, Graz (AT); Franz W. Leberl, Sankt Anton am Arlberg (AT); Konrad Karner, Raaba (AT); Zanin Cosic, Graz (AT); Hannes Hegenbarth, Hausmannstaetten (AT); Gur Kimchi, Bellevue, WA (US); John Charles Curlander, Boulder, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1300 days.

(21) Appl. No.: 12/355,808

(22) Filed: Jan. 19, 2009

(65) Prior Publication Data
US 2010/0182396 A1 Jul. 22, 2010

(51) Int. Cl.
| | |
|---|---|
| *G02B 15/14* | (2006.01) |
| *G01S 19/14* | (2010.01) |
| *G01S 19/49* | (2010.01) |
| *H04N 5/247* | (2006.01) |

(52) U.S. Cl.
CPC .............. *G01S 19/14* (2013.01); *G01S 19/49* (2013.01); *H04N 5/247* (2013.01)

(58) Field of Classification Search
CPC ............ H04N 5/23238; H04N 5/2628; H04N 5/2259; H04N 5/247; G06T 3/4038; G02B 13/06; G01S 19/14; G01S 19/49
USPC ............................................ 348/36; 382/285
See application file for complete search history.

(56) References Cited

U.S. PATENT DOCUMENTS

| | | | |
|---|---|---|---|
| 7,339,614 B2 | 3/2008 | Gruber et al. | |
| 2006/0233461 A1* | 10/2006 | Ma et al. ................. | 382/285 |
| 2006/0238382 A1 | 10/2006 | Kimchi et al. | |
| 2008/0050011 A1 | 2/2008 | Ofek et al. | |
| 2008/0111815 A1 | 5/2008 | Graves et al. | |
| 2008/0117287 A1* | 5/2008 | Park et al. ................ | 348/36 |
| 2008/0221843 A1 | 9/2008 | Shenkar et al. | |

OTHER PUBLICATIONS

Coors, et al., "Mona 3D—Mobile Navigation Using 3D City Models", retrieved at <<http://www.geographie.uni-bonn.de/karto/MoNa3D.Telecarto-2007-vc.az.full.pdf>>, pp. 10.
Haala, et al., "Panoramic Scenes for Texture Mapping of 3D City Models", retrieved at <<http://www2.informatik.hu-berlin.de/sv/pr/PanoramicPhotogrammetryWorkshop2005/Paper/PanoWS_Berlin2005_Haala.pdf>>, pp. 6.
Frueh, et al., "Constructing 3D City Models by Merging Ground-Based and Airborne Views", retrieved at <<http://www-video.eecs.berkeley.edu/papers/frueh/cvpr2003.pdf>>, pp. 8.
Deng, et al., "Construct 3D City Model by Multi-Sensor Data", ISPRS Workshop on Service and application of Spatial Data Infrastructure, XXXVI (4/W6), Oct. 14-16, Hangzhou, China, retrieved at <<http://www.commission4.isprs.org/workshop_hangzhou/papers/187-190%20Fei%20DENG-A090.pdf>>, pp. 187-190.

* cited by examiner

*Primary Examiner* — Robert B Harrell
(74) *Attorney, Agent, or Firm* — Steven Spellman; Danielle Johnston-Holmes; Micky Minhas

(57) ABSTRACT

A system that facilitates collecting data is described herein. The system includes a digital camera that is configured to capture images in a visible light spectrum and a near-infrared camera that is configured to capture near infrared images, wherein a field of view of the digital camera and the field of view of the near-infrared camera are substantially similar. The system further includes a trigger component that is configured to cause the digital camera and the near-infrared camera to capture images at a substantially similar point in time, and also includes a mounting mechanism that facilitates mounting the digital camera and the near-infrared camera to an automobile.

20 Claims, 12 Drawing Sheets

THREE DIMENSIONAL IMAGE CAPTURE SYSTEM FOR IMAGING BUILDING FACADES USING A DIGITAL CAMERA, NEAR-INFRARED CAMERA, AND LASER RANGE FINDER

BACKGROUND

Functionality of conventional mapping applications that are accessible by way of the Internet has substantially increased over time. For instance, a user can access a mapping application and be provided with an overhead view of one or more streets. Still further, the user may provide an initial location (e.g., street address) and a destination, and the mapping application can provide the user with detailed directions pertaining to travelling between the initial location and the destination.

Mapping applications have further developed such that an individual can view aerial images of a particular region. For instance, if a user enters a particular location (e.g., address, business name, . . . ), the user can be provided with aerial images pertaining to such entered location. These images may then be subjected to a zooming function, such that the user can be provided with a relatively close aerial view of the entered location. Furthermore, driving directions may be graphically laid on the aerial images, thus providing the user with some context with respect to a route to be traveled between the initial location and the destination.

Some mapping applications have further been adapted to include three-dimensional models of buildings in certain cities. Thus, a user can enter a location into the mapping application, and be placed in a three-dimensional model pertaining to such location. The user may then navigate the three-dimensional model to be provided with context pertaining to the location. For instance, if the user is planning to travel to Paris, France, the user can provide the mapping application with the location of Paris, France, and be provided with a three-dimensional representation of the city. The user could then navigate the provided representation and be provided with a first-person perspective. Thus, the user can "travel" through the city to obtain information pertaining to such city, such as the height of buildings, location of buildings with respect to one or more streets, etc.

Typically, these three-dimensional models are generated first, and thereafter are updated with aerial images, which can be used to provide greater information pertaining to a building or buildings, such as the look of a building facade. Because these images are aerial images, however, the resolution of the images is less than desired. Moreover, the captured aerial images may not be well-suited for adaption to the three-dimensional models.

SUMMARY

The following is a brief summary of subject matter that is described in greater detail herein. This summary is not intended to be limiting as to the scope of the claims.

Various technologies pertaining to capturing data for utilization in connection with generating a three-dimensional model of a building or buildings are described in detail herein. A data capture system described herein can be configured for mounting on an automobile that travels over streets, such that images and corresponding metadata of surrounding buildings or terrain can be captured and used in connection with generating a three-dimensional representation of a geographic region.

The data capture system can include a plurality of digital cameras that are positioned to capture images of building facades, for instance, as the automobile travels over a street. A subset of the plurality of digital cameras can be positioned in a panoramic head, such that images captured by the cameras in the panoramic head can be stitched together to create a panoramic image. An additional pair of digital cameras can be vertically offset from the panoramic head, thereby providing a vertical parallax that can be employed in connection with generating a three-dimensional representation of a building, for instance. A horizontal parallax can be generated by consecutively captured images as the automobile travels over the street.

At least another pair of cameras can be positioned such that the field of view is vertically above the field of view of digital cameras in the panoramic head. For instance, the digital cameras in the panoramic head can be configured to capture images in the vertical direction between zero meters from the ground and ten meters above the ground. The additional pair of digital cameras can be configured to capture images between, for instance, five meters above the ground and thirty meters above the ground.

The data capture system can further include at least one near-infrared camera. The near-infrared camera can be positioned proximate to at least one of the digital cameras, such that the near infrared camera and the at least one digital camera have substantially similar fields of view. The near infrared camera and the at least one digital camera can be synchronized such that the near infrared camera captures images at substantially similar times that the at least one digital camera (and other digital cameras in the system) capture images.

The data capture system may additionally include a plurality of laser measurement systems (LMSs) that can scan in a particular plane to determine a distance between the LMSs and an object (such as a building) for a plurality of degrees in the particular plane. For instance, the data capture system can include at least three LMSs: a first LMS configured to scan in a horizontal plane (parallel to the ground) in the direction of travel of the automobile; a second LMS configured to scan in a vertical plane on a first side of the automobile; and a third LMS configured to scan in a vertical plane on a second side of the automobile (opposite the first side of the automobile).

The data capture system can further include other sensors that can sense parameters pertaining to a particular geographic region, including a GPS sensor, a velocity sensor and/or an odometer, an accelerometer, an inertial navigation system, and/or other sensors. Data from such sensors can be correlated to images captured by the digital cameras and the near infrared camera(s). For instance, data can be synchronized and used in connection with generating three-dimensional models of the geographic region.

Other aspects will be appreciated upon reading and understanding the attached figures and description.

DETAILED DESCRIPTION

Figure 1:
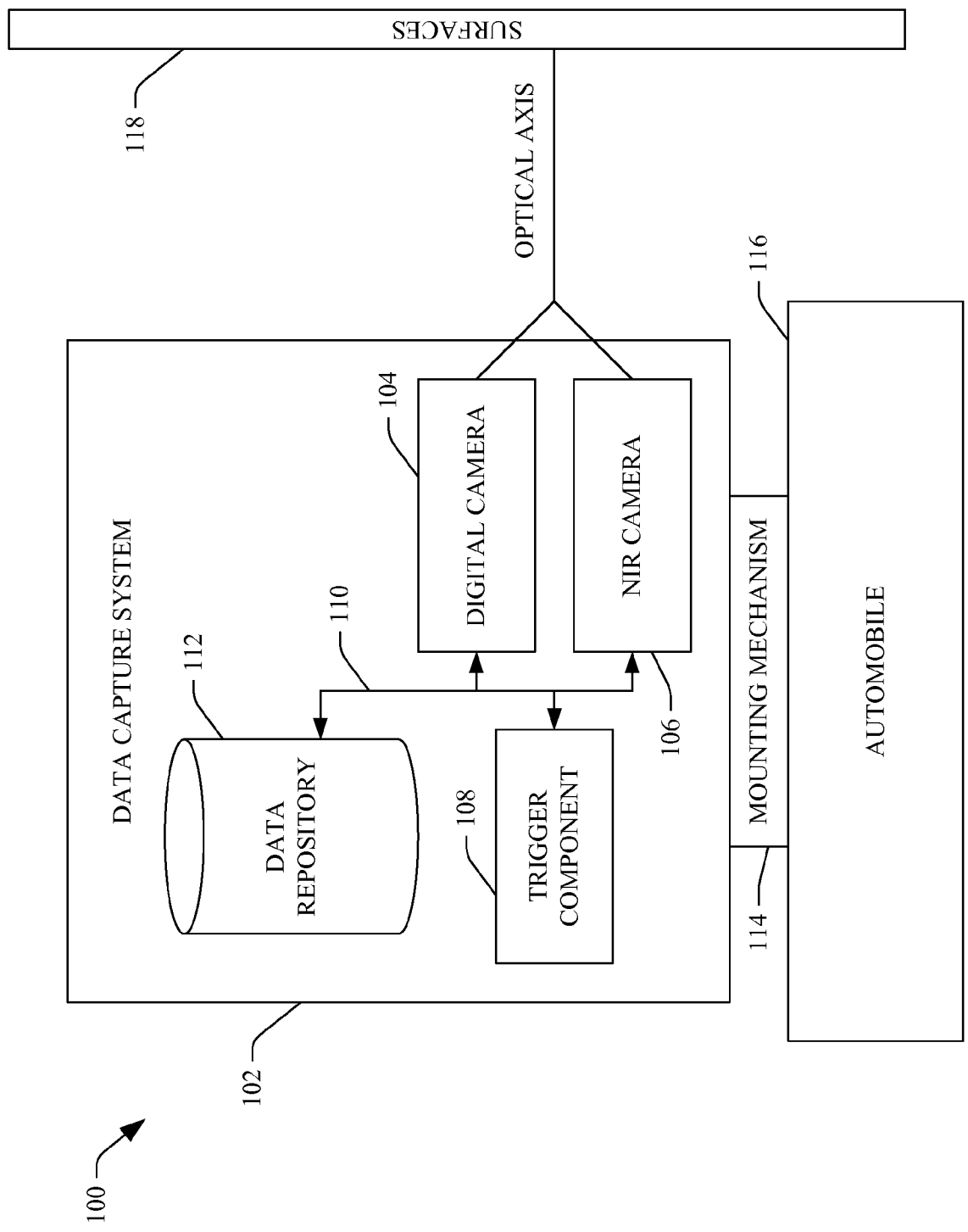
FIG. 1 is a functional block diagram of an example system that facilitates capturing image data from a digital camera and a NIR camera.

Various technologies pertaining to capturing data from cameras and sensors will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates capturing images is illustrated. The system 100 includes a data capture system 102, which can include a digital camera 104 and a near-infrared (NIR) camera 106. The digital camera 104 and the NIR camera 106 can be positioned proximate to one another such that the field of view of the digital camera 104 and the field of view of the NIR camera are substantially similar. Furthermore, the digital camera 104 and the NIR camera 106 can be configured to capture images at a relatively high frame rate, such as between five and thirty images per second.

The data capture system 102 can additionally include a trigger component 108 that is in communication with the digital camera 104 and the NIR camera 106. A communications channel 110 can communicatively couple the digital camera 104 and the NIR camera 106 with the trigger component, wherein the communications channel 110 can be a wireless communications channel, a wireline channel, a serial interface, a bus, or other communications channel. The trigger component 108 can output trigger signals that can be received by the digital camera 104 and the NIR camera 106 at substantially similar points in time. The digital camera 104 and the NIR camera 106 can, responsive to receipt of a trigger signal from the trigger component 108, capture an image (e.g., the digital camera 104 and the NIR camera 106 can each capture an image). Thus, the digital camera 104 and the NIR camera 106 can be configured to capture images at substantially similar points in time. The trigger component 108 can output trigger signals periodically, upon receipt of a signal from the digital camera 104 and/or the NIR camera 106 indicating that such cameras are prepared to capture images, upon receipt of data from one or more additional sensors (not shown), etc.

The data capture system 102 can additionally include a data repository 112 that can be in communication with the digital camera 104, the NIR camera 106, and the trigger component 108, for instance, by way of the communications channel 110 or other communications channel. The data repository 112 can be configured to retain images output by the digital camera 104 and images output by the NIR camera 106, as well as timestamps, for instance, output by the trigger component 108, wherein timestamps output by the trigger component 108 can be used in connection with correlating images output by the digital camera 104 and the NIR camera 106 with metadata captured by other sensors (not shown).

The system 100 may additionally include a mounting mechanism 114 that can be used in connection with mounting the data capture system 102 to an automobile 116. For instance, the mounting mechanism 114 may include one or more clamps, a rack, a strap, or other mechanism for mounting the data capture system 102 to the automobile 116. Pursuant to an example, a carbon fiber housing may at least partially encapsulate the data capture system 102 (and thus may at least partially encapsulate the digital camera 104 and the NIR camera 106), and the carbon fiber housing may be mounted to the automobile 116 by way of the mounting mechanism 114. Design of the mounting mechanism may alter with type and model of the automobile 116. For instance, the mounting mechanism 114 may include an adjustable rack that can be adjusted depending on the type and model of the automobile 116.

In operation, the digital camera 104 and the NIR camera 106 can be configured to capture images of one or more surfaces 118, such as building facades in a city. Thus, the digital camera 104 and the NIR camera 106 may be positioned with respect to the automobile 116 such that the field of view of the digital camera 104 and the NIR camera 106 is approximately orthogonal to the direction of travel of the automobile 116. Further, the digital camera 104 and the NIR camera 106 can be positioned to capture images that include at least a bottom two floors of buildings (e.g., from the ground to between five and ten meters above the ground, for instance). The digital camera 104 and the NIR camera 106 (at the control of the trigger component 108) can be configured to capture images as the automobile 116 travels over a street. Moreover, the digital camera 104 and the NIR camera 106 can be configured such that consecutively captured images have at least a threshold amount of forward overlap, such as in the order of between 60% and 80%.

Images captured by the digital camera 104 and the NIR camera 106 can be used to generate a three-dimensional representation of a geographic region, such as a street, a building, etc. For instance, information pertaining to distance from the digital camera 104 at the time an image is captured can be used in connection with automatically generating a three-dimensional representation. Images captured by the NIR camera 106 can be used in connection with classifying vegetation or other living beings. If desired, objects classified as vegetation (or other living being) can be removed from the three-dimensional representation. Thus, images captured by the NIR camera 106 can be employed in connection with filtering vegetation or other living being from the three-dimensional model.

Figure 2:
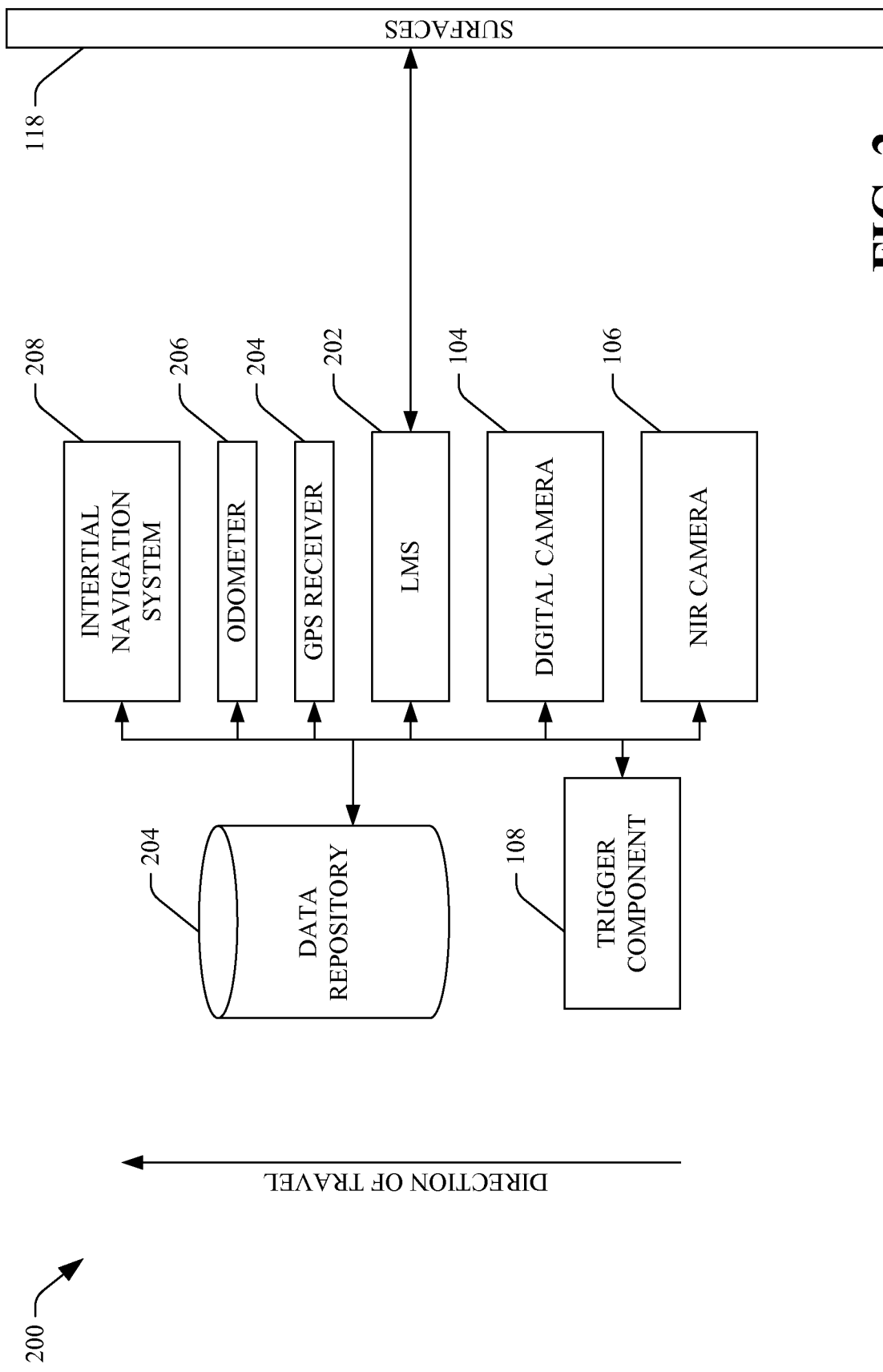
FIG. 2 is a function block diagram of an example system that facilitates capturing image data and corresponding metadata in a data capture system that is mounted to an automobile.

Referring now to FIG. 2, an example data capture system 200 is illustrated. As with the data capture system 102, the data capture system 200 can be mounted to an automobile by way of a suitable mounting mechanism. Furthermore, a carbon fiber housing may at least partially encapsulate one or more modules of the system 200.

The system 200 includes the digital camera 104 and the NIR camera 106, which are positioned proximate to one another such that the digital camera 104 and the NIR camera 106 have a substantially similar field of view. The system 200 further includes the trigger component 108 that can output trigger signals that control operation of the digital camera 104 and/or the NIR camera 106. More particularly, the trigger component 108 can cause the digital camera 104 and the NIR camera 106 to operate synchronously with respect to one another (e.g., capture images at substantially similar points in time).

The system 200 may further include at least one laser measurement system (LMS) 202. The LMS 202 can be configured to output data packets indicative of distance between the system 200 and the surfaces 118. For instance, the LMS 202 can be configured to output lasers in one degree increments, and can ascertain a distance between the system 200 and the surfaces 118 by determining a travel time of the lasers for each degree. In an example, the LMS 202 can be configured to scan vertically (perpendicular to the ground) in a direction orthogonal to a direction of travel of an automobile upon which the system 200 is mounted. In another example, the LMS 202 can be configured to scan horizontally (parallel to the ground) in a direction of travel of the automobile upon which the system 200 is mounted. Still further, the system 200 may include multiple LMSs, wherein two of the LMSs are configured to scan vertically in opposite directions (orthogonal to the direction of travel of the automobile upon which the system 200 is mounted), and wherein another LMS is configured to scan horizontally in the direction of travel of the automobile upon which the system 200 is mounted. The system 200 may also include other LMSs that are configured to scan in other directions.

Furthermore, the LMS 202 can operate responsive to a trigger signal from the trigger component 108. Thus, the LMS 202 can output data indicating a distance between the surfaces 118 and the system 200 at a substantially similar time (and location) that images are captured by the digital camera 104 and the NIR camera 106. The correlation of time/location can be used at a later point in time in connection with generating a three-dimensional representation of a building or buildings, wherein such representation can include images of building facades. The LMS 202 may be in communication with the trigger component 108 by way of the communications channel 110 or other suitable communications channel.

The system 200 may further include a GPS receiver 204 that can output data indicative of a current location (e.g., latitude/longitude coordinates) of the system 200. Again, the GPS receiver 204 may be in communication with the trigger component 108 (e.g., by way of the communications channel 110), such that the GPS receiver 204 outputs data indicative of the current location in response to receiving a trigger signal from the trigger component 108. Thus, the GPS receiver 204 can act to output data at substantially similar times that the LMS 202 outputs data and the digital camera 104 and the NIR camera 106 output images. In another example, the GPS receiver 204 may output data independent of the trigger component 108 at a particular sampling frequency.

The system 200 may additionally include an odometer 206 that can output data pertaining to a distance travelled by the system 200 over a certain period of time or between certain geographic locations. The odometer 206 may output data in response to a trigger signal from the trigger component 108 (e.g., received by way of the communications channel 110), or may output data independent of the trigger component 108.

An inertial navigation system (INS) 208 may be included in the system 200, and may act to output data indicative of an angular velocity of the system 200, linear velocity of the system 200, and/or other data at a given point in time. For instance, the INS 208 may include one or more accelerometers that can output data that is indicative of acceleration of the automobile 116 and/or velocity of the automobile 116. The INS 208 may additionally include one or more gyroscopes that can output data indicative of angle of rotation (in three dimensions). The INS 208 may output data in response to trigger signals output by the trigger component 108 and received by way of the communications channel 110 or other suitable channel, or may be configured to output data independent of the trigger component 108 at a certain sampling rate.

The system 200 can further include the data repository 112, which can be in communication with the digital camera 104, the NIR camera 106, the LMS 202, the GPS receiver 204, the odometer 206, and the INS 208 by way of the communications channel 110 or other communications channel. The data repository 112 can be configured to at least temporarily retain data output by the digital camera 104, the NIR camera 106, the LMS 202, the GPS receiver 204, the odometer 206, and the INS 208. Pursuant to an example, data in the data repository 112 can be synchronized such that data output by the data sources in the system 200 accord to a common time base. For instance, the GPS receiver 204, the odometer 206, and/or the INS 208 may operate independently of the trigger component 108, such that these data sources may output data with respect to different time bases, and data output by such data sources can be synchronized by way of a synchronization module.

Pursuant to an example, timestamps may be output by the trigger component 108 each time the trigger component 108 transmits a trigger signal and/or each time a data source in communication with the trigger component 108 transmits a synchronization signal (e.g., each time a data source indicates that the data source is capturing data). Furthermore, timestamps (system timestamps) can be assigned to data packets as the data packets are received by a general purpose computing device (e.g., a computing device that includes the data repository 112). The system timestamps can conform to a time base that is independent of the time base used by the trigger component 108. A correlation can be ascertained between timestamps generated by the trigger component 108 and a timestamp of the system timestamps, and thus data packets/images output by the digital camera 104, the NIR camera 106, the LMS 202, the GPS receiver 204, the odometer 206, and the INS 208 can be assigned timestamps that have a common time base. Thus, such data packets can be synchronized.

With respect to the trigger component 108, in an example, the trigger component 108 can output trigger signals periodically. In another example, the trigger component 108 can output trigger signals based at least in part upon data output by the LMS 202, the GPS receiver 204, the odometer 206, and/or the INS. For instance, it may be desirable to have a predefined forward overlap between images consecutively captured by the digital camera 104, wherein forward overlap is an amount of overlap of content in consecutively captured images. Forward overlap may be based at least in part upon location of the system 200 (as ascertained by the GPS receiver 204), distance from the system 200 to the surfaces 118 (as output by the LMS 202), distance between consecutively captured images (as output by the odometer 206), and/or angular velocity (as output by the INS 208). Thus, the trigger component 108 can output trigger signals based at least in part upon data packets received from one or more of such data sources.

Furthermore, the system 200 may include numerous other data sources. For instance, the system 200 may include a plurality of digital cameras that can be arranged in different manners. For instance, a plurality of digital cameras can be placed in a panoramic head. In another example, a camera pair can be vertically offset from the panoramic head. Still further, one or more cameras can be horizontally offset from the panoramic head. Other arrangements are described in greater detail herein.

Additionally, the system 200 may include a velocity sensor, a distance measurement unit, a plurality of NIR cameras, amongst other data sources.

As data output from data sources in the system 200 can be used in connection with generating a three-dimensional representation of a city, for instance, it is desirable to track with precision the trajectory of the system 200 during a recording session. Thus, for each data packet output by the data sources, a corresponding geographical indicator may be desirable.

The system 200 may include a relatively accurate position sensor, such that a location of the system 200 can be determined relatively accurately (e.g., within one meter) for each data packet output by the data sources in the system 200. Furthermore, the system 200 may include orientation sensors that can provide data with an accuracy within a small number of radians per second.

In another example, the system 200 may include relatively low cost sensors that are somewhat less accurate. For instance, the GPS receiver 204 can output position within five meters of an actual position, the INS 208 can output data pertaining to linear acceleration during a short time period relatively accurately, and the odometer 206 (or other velocity sensor) can output data pertaining to velocity of a vehicle upon which the system 200 is mounted relatively accurately. Data output by these data sources can be intelligently combined with images generated by the digital camera 104 and the NIR camera 106 (image bundles) and data from the LMS 202 together with known information pertaining to the environment (existing maps and/or three-dimensional models).

The data sources in the system 200 may be calibrated in a laboratory environment and/or in real-time during operation of the system 200. The process of determining geometric properties of the data sources in the system is referred to herein as geometric calibration.

More particularly, the data sources can be analyzed such that internal geometric properties and systematic errors of individual data sources can be ascertained, as well as a substantially optimal geometric arrangement (location, translation, rotation) of sensors relative to a reference coordinate system. More particularly, parameters pertaining to internal orientation of the digital camera 104, such as focal length, principle point coordinate and lens distortions can be ascertained. This can be accomplished by capturing calibration images of a known three-dimensional arrangement of target points. In each image, the two-dimensional coordinates of the known target points can be measured, and individual parameters can be computed in a bundle adjustment process.

After each camera (including digital cameras and NIR cameras) in the system 200 has been calibrated internally, the cameras can be mounted into a housing (such as a carbon fiber housing) in their respective positions. Once in the housing, additional images may be captured using the system 200. Such images can be used to determine relative orientation between individual sensors by a further bundle adjustment process on measured two-dimensional image point coordinates. Similarly, internal and external calibration parameters of LMSs in the system 200 can be ascertained by evaluating measured depth-profiles from laser scanners, known geometry of a calibration lab, and coordinates of each laser point in the calibration room observed with the NIR camera 106.

Figure 3:
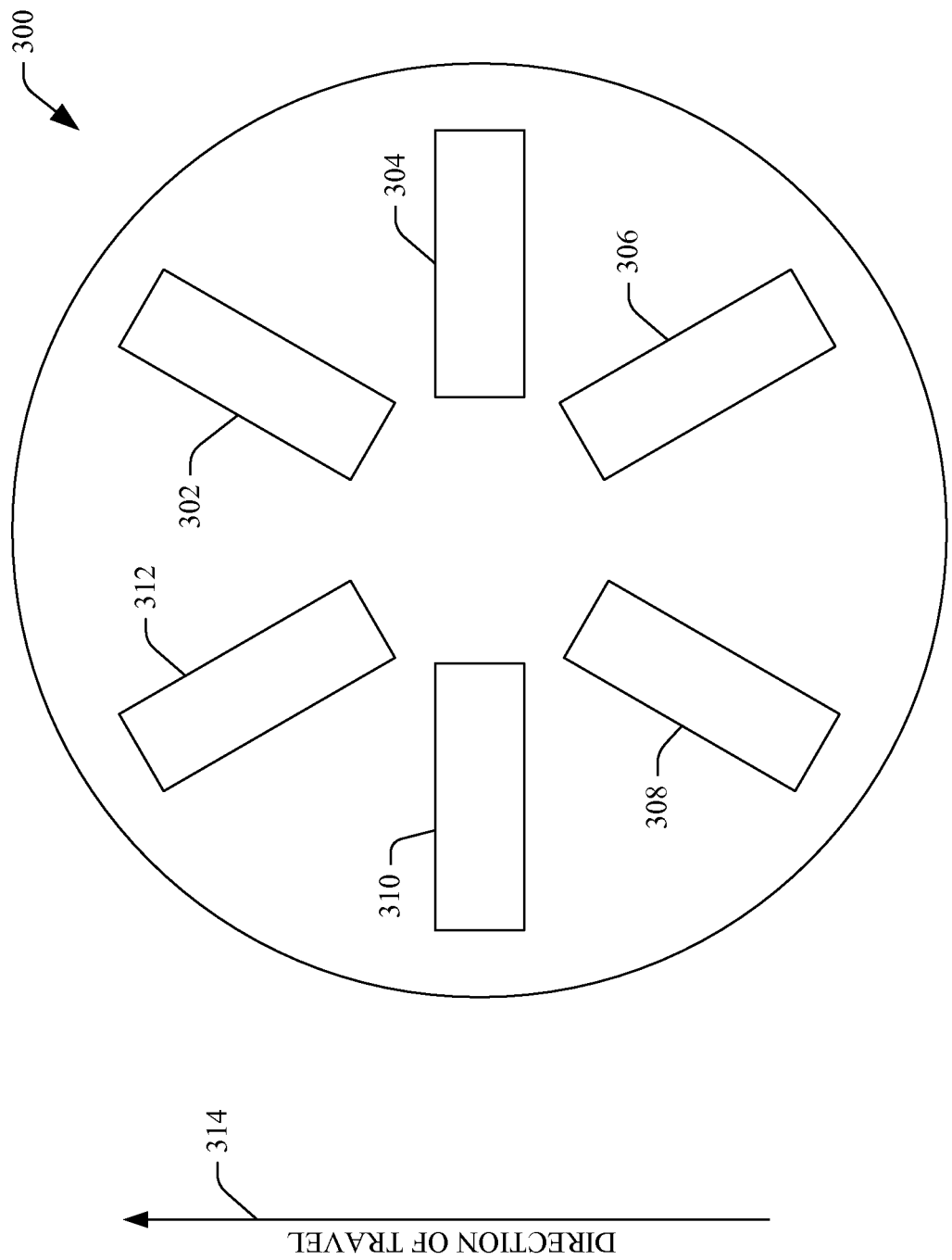
FIG. 3 is an example panoramic head.

With reference now to FIG. 3, an example panoramic head 300 that includes a plurality of digital cameras is illustrated, wherein the panoramic head 300 can be included in the system 200 (FIG. 2). The example panoramic head 300 is shown as including six digital cameras 302, 304, 306, 308, 310, and 312. It is to be understood, however, that the panoramic head 300 can include more or fewer cameras. The digital cameras in the panoramic head 300 can have a field of view of approximately 65 degrees in a horizontal direction and approximately 90 degrees in a vertical direction. Thus, each image captured by one of the digital cameras 302-312 can overlap with an image captured by an adjacent digital camera.

In an example, the digital camera 104 (FIGS. 1 & 2) can be included in the panoramic head 300. Furthermore, each of the digital cameras 302-312 may operate responsive to the trigger component 108, such that each of the digital cameras 302-312 can capture images at substantially similar points in time. Thus, the images can be stitched together to create a panoramic image for a particular instance in time and location.

The panoramic head 300 can be configured on an automobile such that the digital cameras 304 and 310 capture images orthogonal to the direction of travel of the automobile. For instance, an example direction of travel is shown with arrow 314. The digital cameras 302 and 306 can be positioned to capture images on a first side of the automobile, wherein the digital camera 302 is configured to capture images in an oblique direction with respect to the direction of travel along the direction of travel and the digital camera 306 is configured to capture images in an oblique direction opposite the direction of travel. Similarly, the cameras 312 and 308 can be positioned to capture images on a second side of the automobile (opposite the first side of the automobile), wherein the digital camera 312 is configured to capture images in an oblique direction with respect to the direction of travel along the direction of travel and the digital camera 308 is configured to capture images in an oblique direction opposite the direction of travel. Images captured by the digital cameras 302, 306, 308, and 312 may have a view of a portion of a building facade, for instance, that is not impeded by an occlusion. Such portions of the images may then be used in connection with generating a three-dimensional model of a building or in connection with texturing.

The digital cameras 302-312 in the panoramic head may be configured to have a particular geometric resolution, which is a smallest possible feature size in a captured image which can be distinguished within an image if it falls onto a single pixel. The feature size can be referred to as a ground sampling distance, which can occur in object space and is proportional to a distance to an object. For the digital cameras 302-312, the geometric resolution can be specified such that at an object distance of twenty meters, the ground sampling distance is, at most, approximately one inch (or approximately 2.5 centimeters), which can allow for recognition of signs on building facades and three-dimensional modeling at an acceptable level of detail. In combination with a selected angle of view, the geometric resolution can lead to a corresponding image format (dimension in number of pixels), which may be in the order of 1360 by 1024 pixels.

Figure 4:
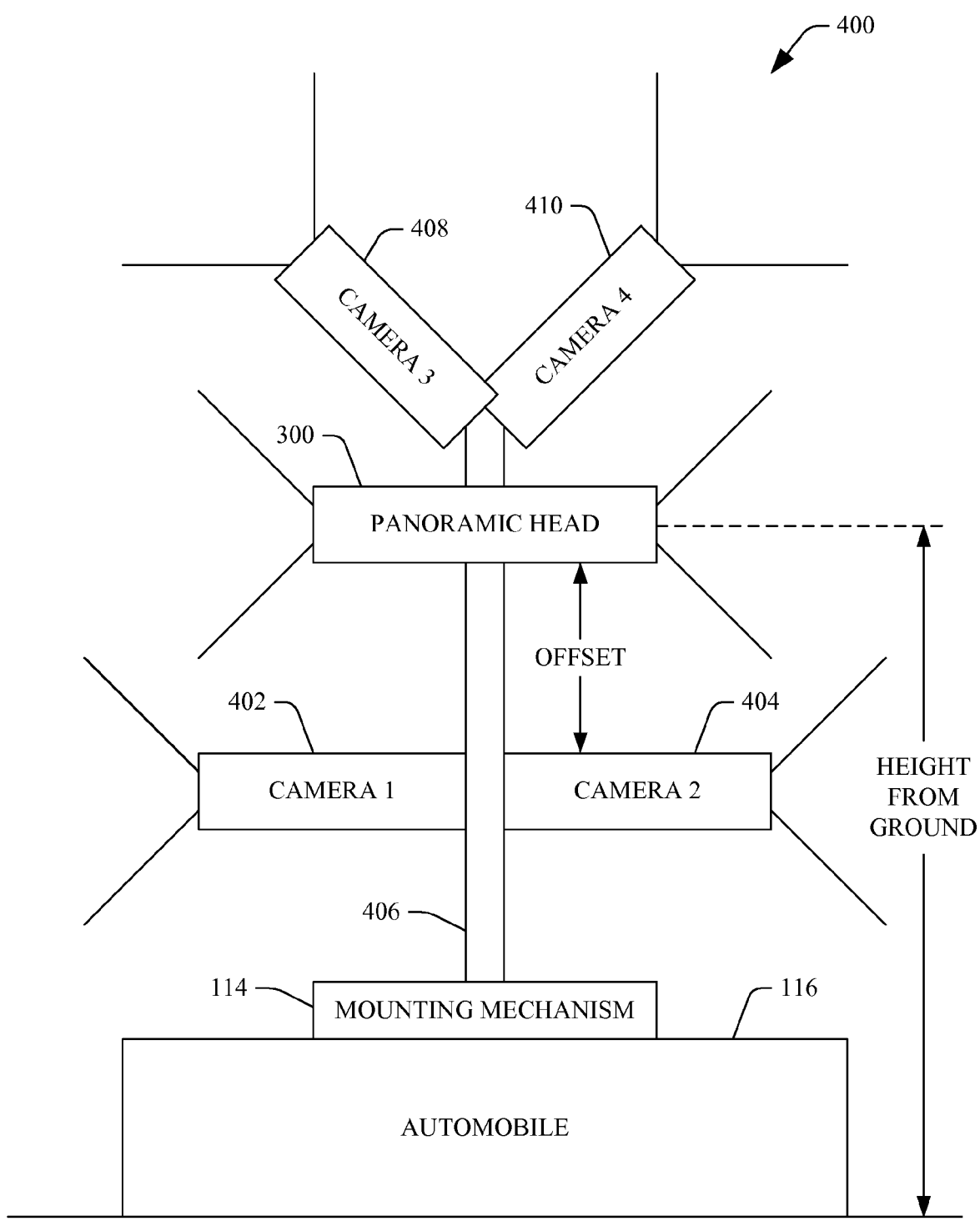
FIG. 4 is a functional block diagram of an example data capture system that includes a plurality of digital cameras positioned to capture images at many different angles.

Now referring to FIG. 4, an example system 400 that facilitates capturing images is illustrated. The system 400 is depicted to illustrate an example arrangement of digital cameras, but it is to be understood that the system 400 may include data sources described above as being included in the system 200.

The system 400 includes the panoramic head 300. In an example, the panoramic head 300 can be positioned at approximately 3.6 meters to 3.8 meters above the ground.

Such distance can be selected based at least in part upon a maximum vehicle height (which can be different for different countries) and a desire to "look over" occlusions that are relatively close to the ground, such as plants, parked vehicles, street furniture, and the like.

The system 400 may additionally include a digital camera pair 402 and 404 that is vertically offset from the panoramic head 300. Capturing images from vertically offset cameras can cause a vertical parallax to be generated in images captured by digital cameras in the panoramic head 300 and images captured by the digital camera pair 402 and 404. The first digital camera 402 can be configured to capture images on a first side of the automobile 116 in a first direction that is substantially orthogonal to a direction of travel of the automobile 116 (and parallel to the digital camera 310 (FIG. 3) in the panoramic head 300). The second digital camera 404 can be configured to capture images on a second side of the automobile 116 in a second direction that is opposite the first direction. The vertical offset between the panoramic head 300 may be between 0.5 meters and 1.5 meters, such as 0.75 meters, 1 meter, 1.25 meters, or may be some other suitable offset.

As noted above, while not shown, the system 400 may additionally include the NIR camera 106, which can be positioned proximate to at least one of the cameras in the panoramic head 300 and/or the first camera 402 and/or the second camera 404. For instance, the NIR camera 106 may be placed proximate to the first digital camera 402, such that the NIR camera 106 and the first digital camera 402 have substantially similar fields of view. A structure 406 can be used in connection with enabling the panoramic head 300 to be vertically offset from the digital camera pair 402-404. Further, while the digital camera pair 402-404 is shown as being vertically beneath the panoramic head 300, it is to be understood that the camera pair 402-404 can be positioned vertically above the panoramic head 300.

The system 400 can additionally include a second digital camera pair 408-410. In a city environment, it may be desirable to capture images of upper portions of taller buildings. Accordingly, the third digital camera 408 can be configured to capture images in an oblique, upward direction with respect to the horizontal plane on the first side of the vehicle (e.g., orthogonal to the direction of travel of the automobile 116), and the fourth digital camera 410 can be configured to capture images in an oblique, upward direction with respect to the horizontal plane on the second side of the vehicle (orthogonal to the direction of travel of the automobile 116). For instance, the angle of view of the third digital camera 408 and the fourth digital camera 410 can be selected to capture images of six or more stories of buildings above the stories that the digital cameras in the panoramic head 300 or the digital camera 402-404 are configured to capture. Thus, the digital cameras 408 and 410 may be configured to capture images of buildings between eight and twenty-eight meters above ground.

As noted above, the panoramic head 300 and the digital cameras 402, 404, 408, and 410 can be mounted to the automobile 116 by the mounting mechanism 114.

Further, each of the digital cameras shown in the system 400 may be configured to operate in response to receipt of a trigger signal from the trigger component 108. Thus, each of the digital cameras may receive a trigger signal from the trigger component at a substantially similar instance in time.

Furthermore, while not shown, at least one other camera pair may be included in the system 400. Such camera pair can be horizontally offset from the panoramic head 300, for instance. In an example, the horizontal offset between the third camera pair can be between 0.5 meters and 1.5 meters.

Figure 5:
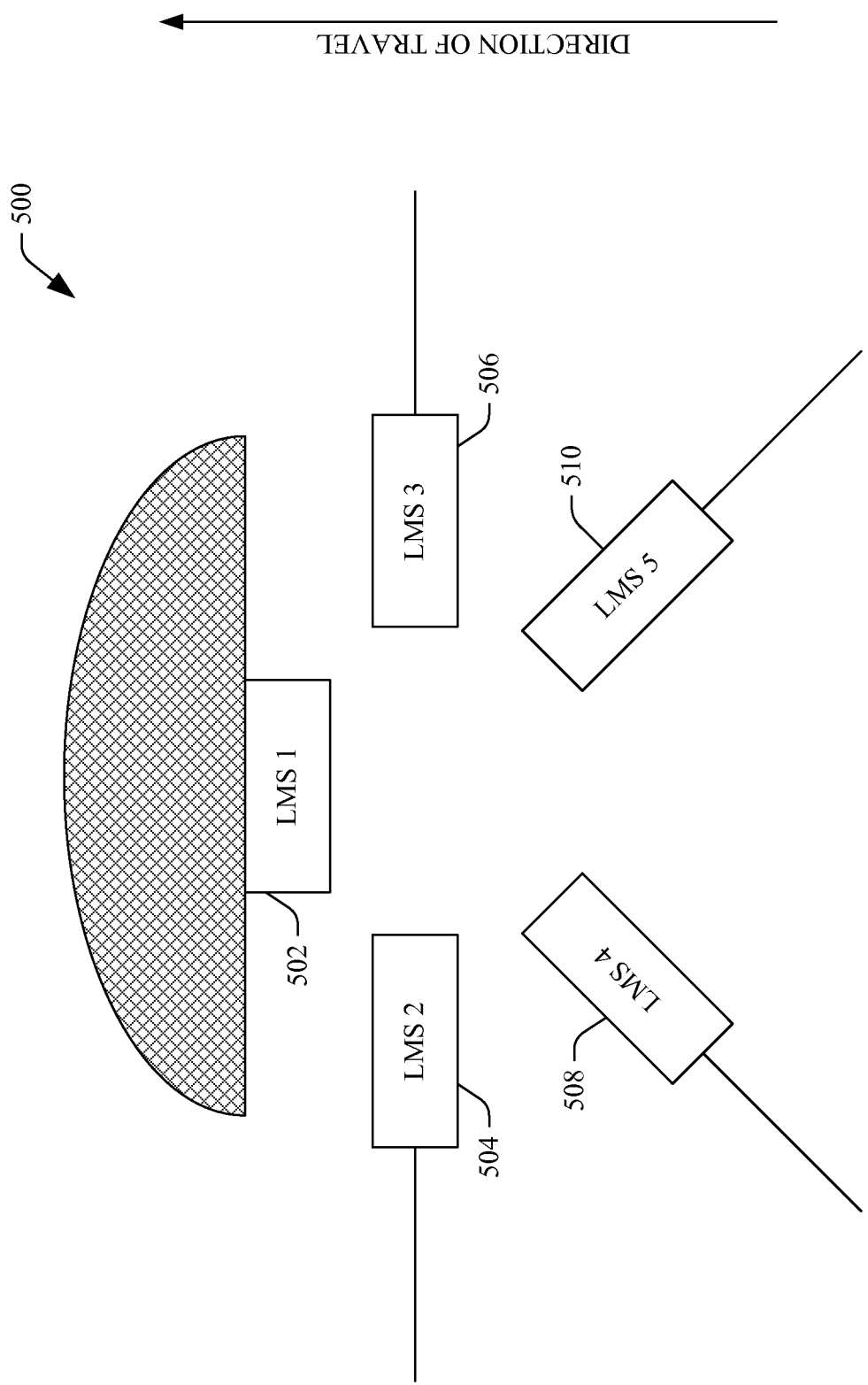
FIG. 5 is an example configuration of LMSs in a data capture system.

Turning now to FIG. 5, an example system 500 that facilitates determining distances between a data capture system and surfaces that are desirably photographed by one or more digital cameras is illustrated. The system 500 may be included in the system 200 and/or the system 400 (FIGS. 2 and 4). The system 500 includes a first LMS 502, a second LMS 504, and a third LMS 506. The system 500 may optionally include a fourth LMS 508 and a fifth LMS 510. The LMSs 502-510 can be employed to measure distances to objects along a 180 degree planar field by measuring the time of flight for each scan angle. Pursuant to an example, the LMSs 502-510 can have resolution of one degree—thus 180 distance measurements can be obtained for each scan undertaken by one of the LMSs 502-510.

The first LMS 502 can be configured to scan in a horizontal plane (parallel to the ground) in a direction consistent with the direction of travel of an automobile upon which the system 500 is mounted. The first LMS 502 can be used to obtain a profile along a street corridor at a certain height above ground. Data obtained from the LMS 502 can be used in connection with generating a three dimensional model of a city, for instance, as it can be employed to align a height profile with known building footprints in the city. Data obtained from the first LMS 502 can also be used to position the system 500 with acceptable accuracy in the city.

The second LMS 504 can be configured to scan in a vertical plane (perpendicular to the ground) on a first side of the automobile approximately orthogonal to the direction of travel. The third LMS 506 can be configured to scan in a vertical plane on a second side of the automobile (opposite the first side of the automobile) approximately orthogonal to the direction of travel. These LMSs 504 and 506 can be used to scan a depth profile across a building facade while traveling by the building, and hence geometric information pertaining to the building can be directly extracted from data output by the LMSs 504 and 506.

The fourth and fifth LMSs 508 and 510 can be configured to scan in a vertical plane obliquely from the direction of travel and opposite the direction of travel on the first and second sides of the automobile. Such LMSs 508 and 510 can be employed to capture distance data for portions of buildings that may have been obstructed by occlusions during scans undertaken by the LMSs 504 and 506. Other additional LMSs may also be included in the system 500.

Each of the LMSs 502-510 can perform a scan responsive to receipt of a trigger signal from the trigger component 108. Thus, the LMSs 502-510 can be synchronized with the digital camera 104 and the NIR camera 106, as well as possibly synchronized with other data sources.

With reference now to FIGS. 6-9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 6:
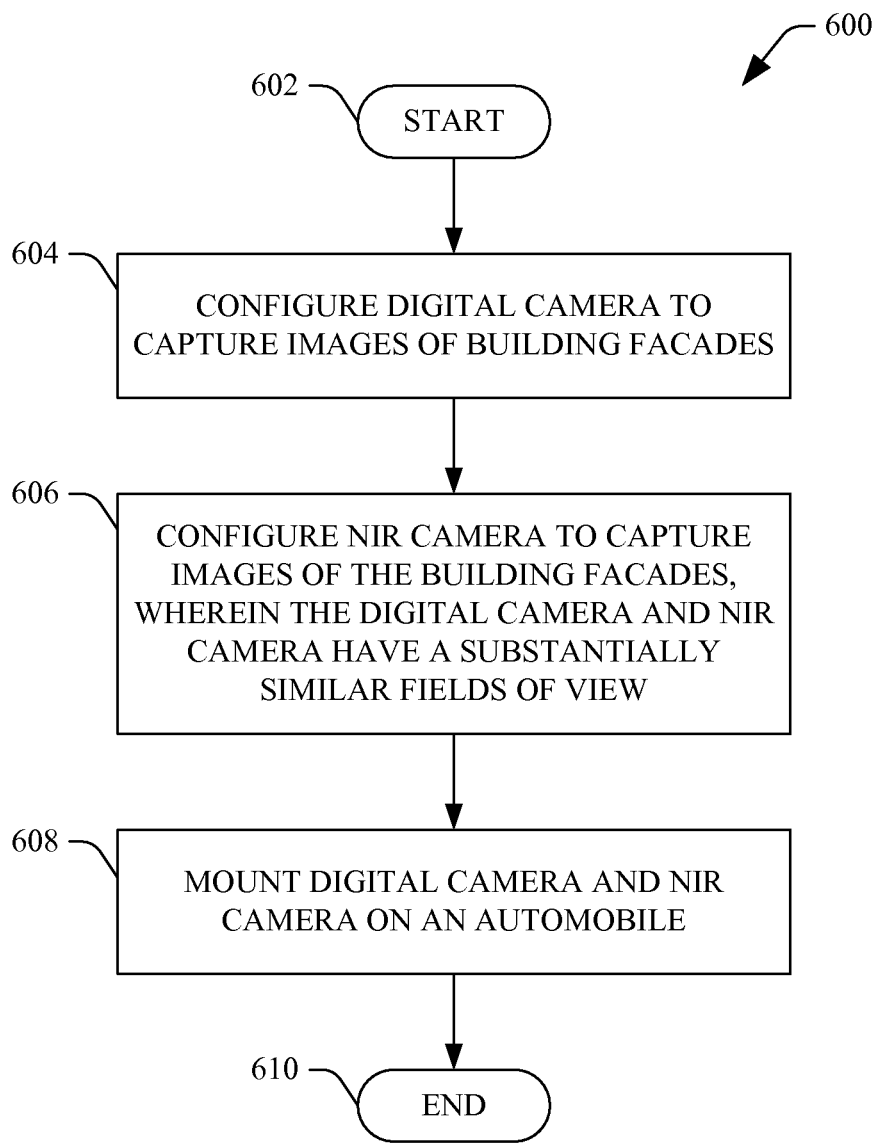
FIG. 6 is flow diagram that illustrates an example methodology for configuring a data capture system to include a digital camera and a NIR camera.

Referring now to FIG. 6, a methodology 600 that facilitates configuring a data capture system is illustrated. The methodology 600 begins at 602, and at 604, a digital camera is configured to capture images of building facades. For instance, the digital camera can be placed in communication with a trigger component that transmits trigger signals that cause the digital camera to capture one or more images.

At 606, a NIR camera is configured to capture images of the building facades, wherein the NIR camera is positioned proximate to the digital camera such that the digital camera and the NIR camera have substantially similar fields of view. The NIR camera may also operate responsive to trigger signals from the trigger component.

At 608, the digital camera and the NIR camera are mounted onto an automobile, such that the digital camera and the NIR camera can capture images of building facades as the automobile travels over one or more streets. The methodology 600 completes at 610.

Figure 7:
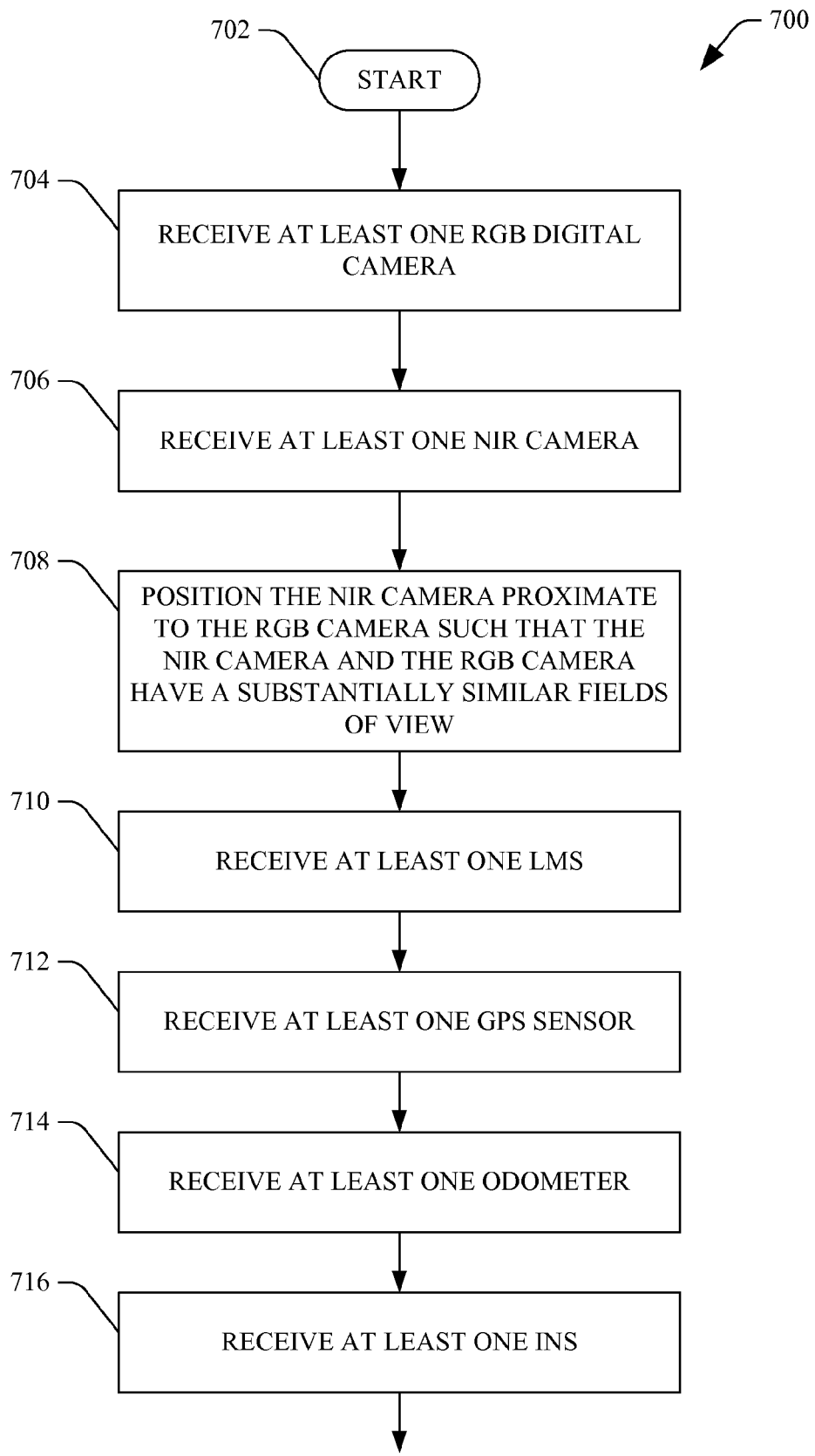
FIG. 7 and 8 depict a flow diagram that illustrates an example methodology for capturing data output by data sources in a data capture system.
Figure 8:
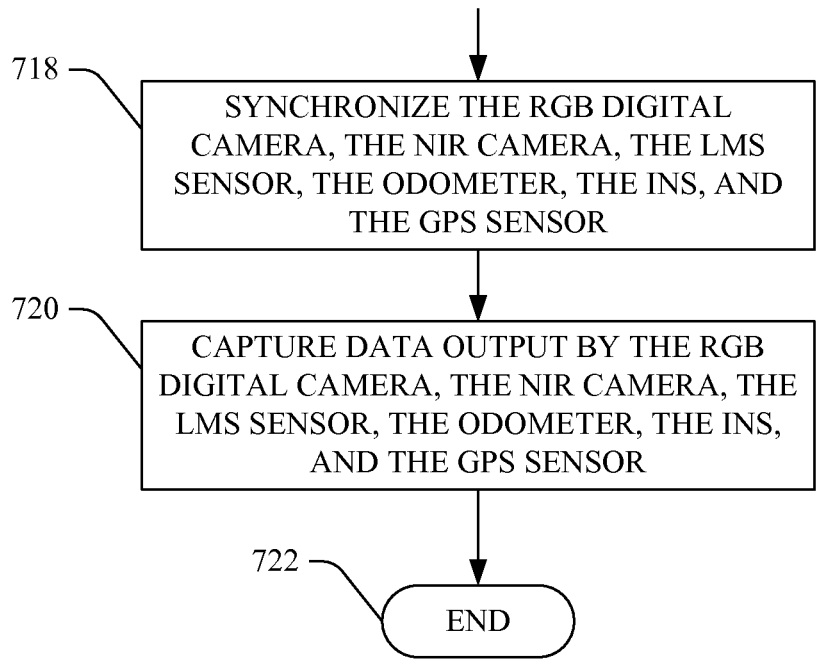

Turning now to FIGS. 7 and 8, an example methodology 700 that facilitates using a data capture system is illustrated. The methodology 700 starts at 702, and at 704 at least one red, green, blue (RGB) digital camera is received. The RGB digital camera can be configured to capture light in the visible spectrum, and can include an RGB filter to provide color values to pixels in a captured image.

At 704, at least one NIR camera is received, wherein the NIR camera is configured to capture light in the near infrared spectrum (e.g., 680 nm-950 nm wave length).

At 706, the NIR camera is positioned proximate to the RGB digital camera, such that the NIR camera and the RGB digital camera have substantially similar fields of view.

At 708, at least one LMS is received, wherein the at least one LMS is configured to perform a laser scan to ascertain a distance between the LMS and an object scanned by the LMS.

At 710, at least one GPS receiver is received, wherein the GPS receiver can output location values (e.g., latitude, longitude values) with an accuracy of approximately +/− five meters.

At 712, at least one odometer (or other suitable velocity sensor) is received, wherein the odometer can be used to output data indicative of velocity of an automobile pertaining to the odometer (and GPS receiver, LMS, NIR camera, and RGB digital camera).

At 714, at least one INS is received, wherein the INS is configured to output data indicative of linear acceleration and/or angular velocity/acceleration of the data capture system.

Turning to FIG. 8, the methodology 700 continues, and at 716, the RGB digital camera, the NIR camera, the LMS, and the GPS receiver are synchronized. For instance, each of the RGB digital camera, the NIR camera, the LMS, and the GPS receiver can be in communication with a trigger component and can output data responsive to receipt of trigger signals from the trigger component. Therefore, these aforementioned data sources can output data packets at substantially similar instances in time.

At 718, data is captured by the RGB digital camera, the NIR camera, the LMS, the GPS receiver, the odometer, and the INS. For instance, the RGB digital camera, the NIR camera, the LMS, the GPS receiver, the odometer, and the INS can be placed in a carbon fiber housing and mounted to an automobile, and can capture data as the automobile is in operation. The methodology 700 completes at 720.

Figure 9:
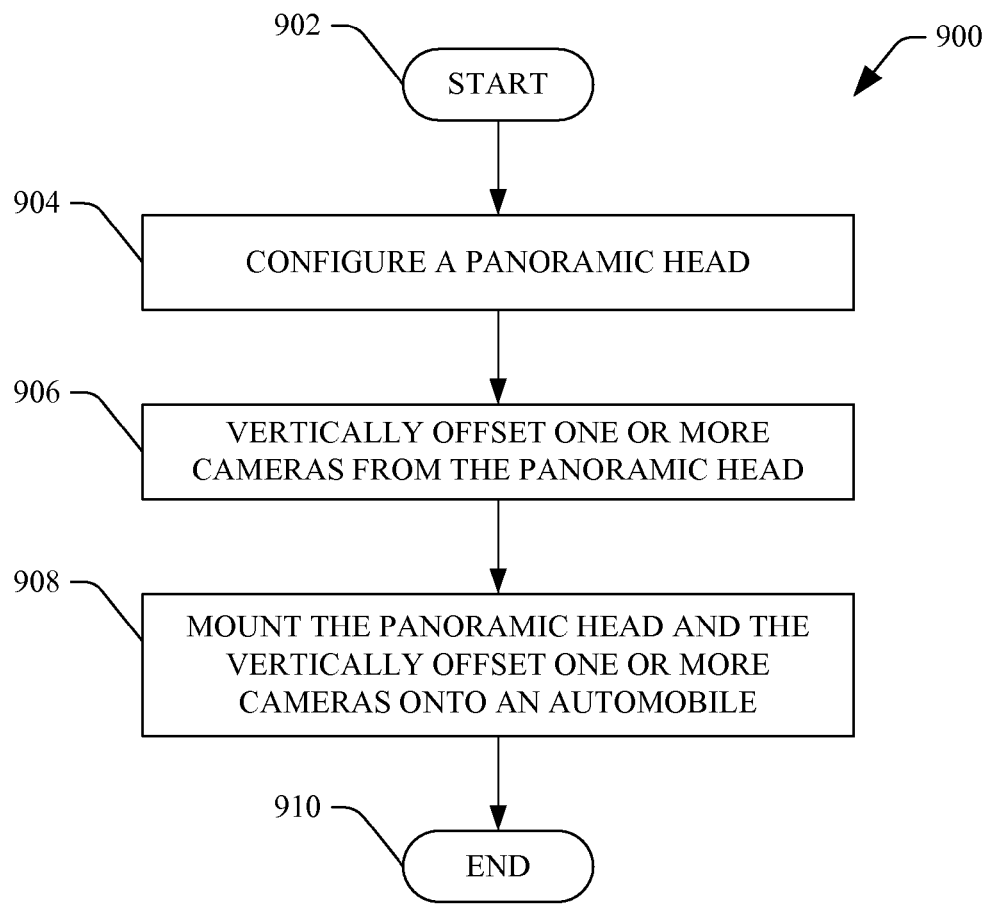
FIG. 9 is a flow diagram that illustrates an example methodology for vertically offsetting digital cameras in a data capture system.

With reference to FIG. 9, an example methodology 900 for mounting a panoramic head of cameras at a vertical offset from another camera is illustrated. The methodology 900 starts at 902, and at 904 a panoramic head is configured. For instance, the panoramic head can include a plurality of digital cameras that, when configured to capture an image at a substantially similar instance in time, can create images that can be stitched together to create a panoramic image. In an example, the panoramic head can include six digital cameras.

At 906, one or more digital cameras are vertically offset from the panoramic head. For example, the at least one digital camera can be vertically offset from the panoramic head by between 0.5 meters and 1.5 meters.

At 908, the one or more digital cameras and the panoramic head are mounted to an automobile. For instance, the one or more vertical cameras and the panoramic head can be at least partially encapsulated by a carbon fiber housing, and such housing can be mounted to the automobile. Thereafter, the one or more digital cameras and the panoramic head can be configured to capture images of building facades as the automobile traverses over one or more streets.

Figures 10, 11:
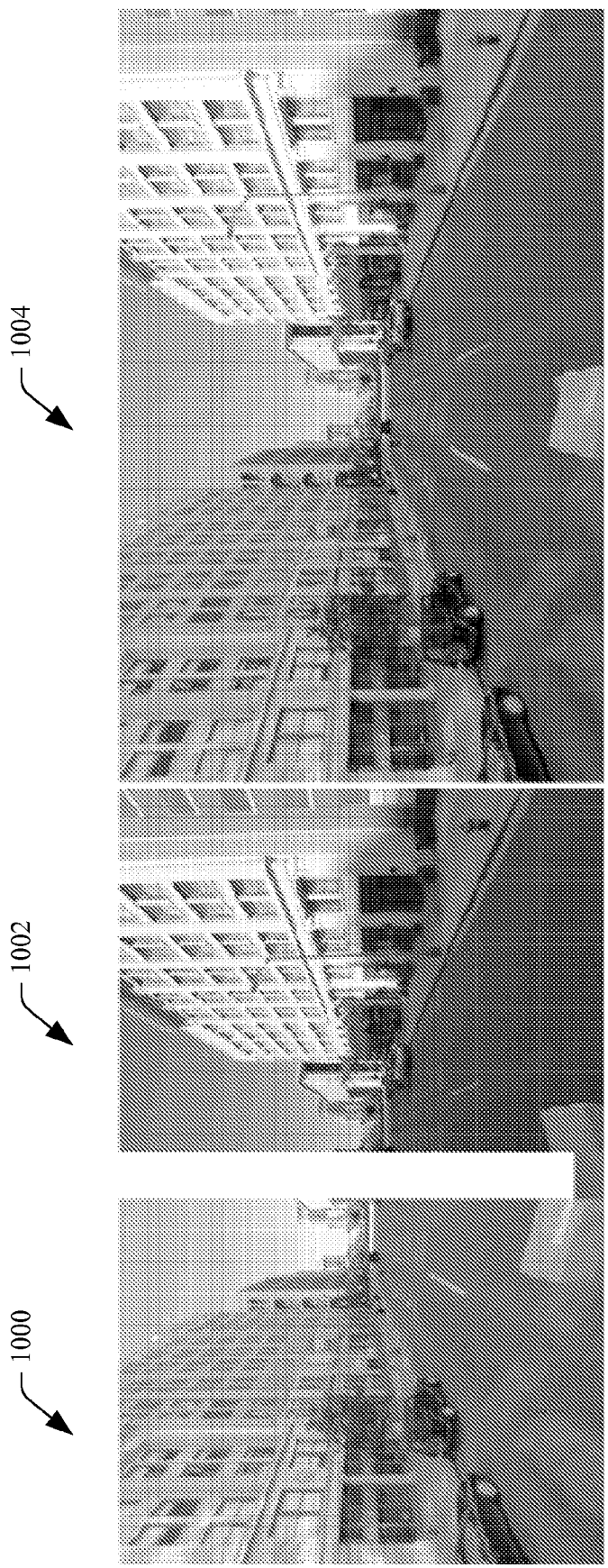
FIG. 10 illustrates example photographs captured by digital cameras in a data capture system.
FIG. 11 illustrates an example stitched photograph.

Now referring to FIG. 10, example images 1000 and 1002 captured by digital cameras 302 and 312, respectively, in the panoramic head (FIG. 3) are illustrated. As can be discerned, the images 1000 and 1002 are taken at oblique, forward-looking angles from the direction of travel of an automobile upon which the panoramic head 300 can be mounted.

Turning to FIG. 11, an example image 1100 is illustrated, wherein the image 1100 can be created by stitching the images 1000 and 1002 together. Again, such stitching can be undertaken with numerous images to create a panoramic image of a geographic region.

Figure 12:
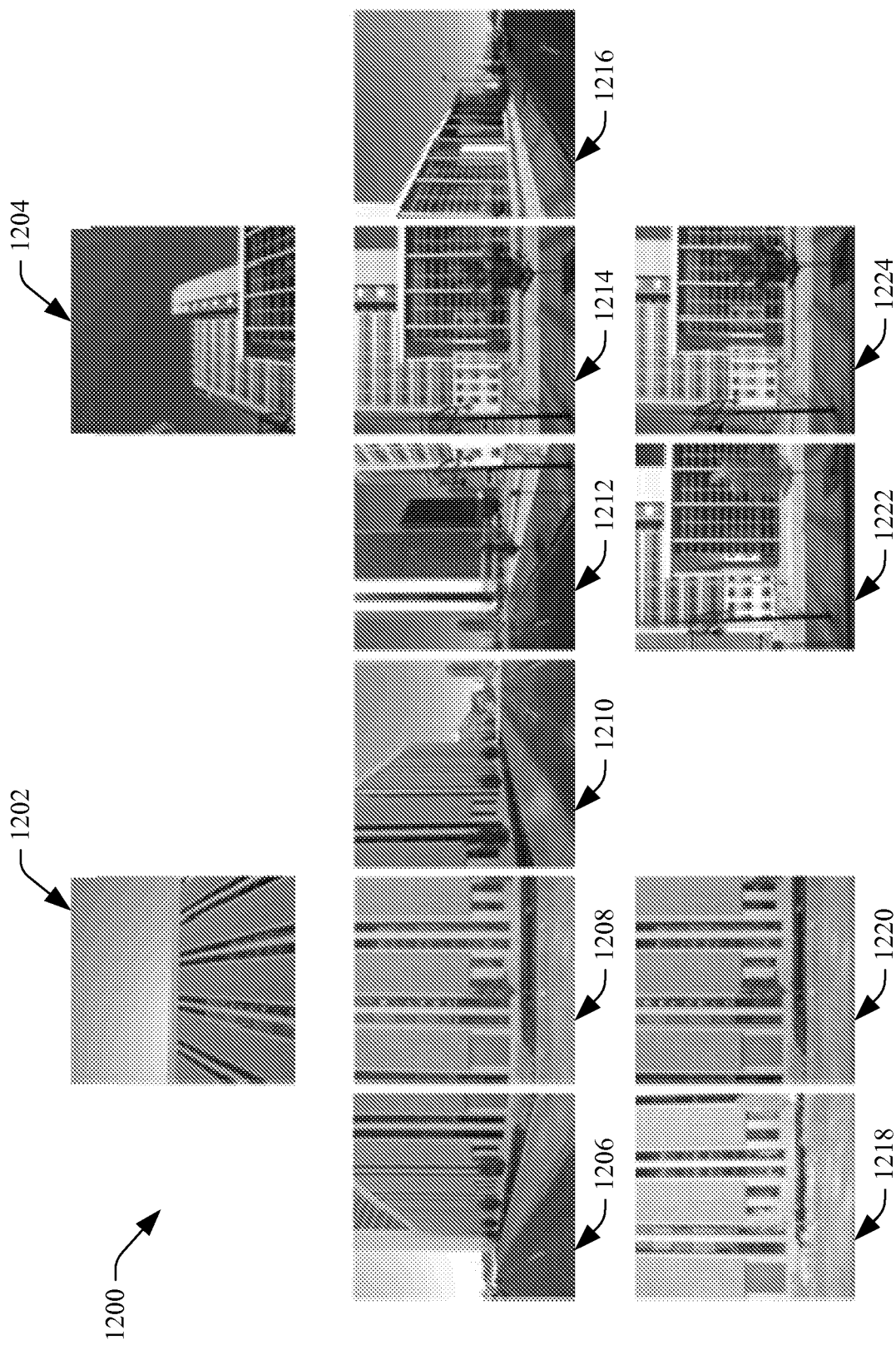
FIG. 12 illustrates a plurality of photographs captured by a plurality of cameras in a data capture system.

Now referring to FIG. 12, an example set of images 1200 captured by digital cameras and NIR cameras in the data capture systems illustrated and described above are depicted. A first image 1202 can be captured by the digital camera 408 (FIG. 4) and a second image 1204 can be captured by the digital camera 410. As can be discerned, these images 1202 and 1204 are of upper portions of buildings.

A third image 1206 can be captured by the digital camera 308 (FIG. 3), a fourth image 1208 can be captured by the digital camera 310, and a fifth image 1210 can be captured by the digital camera 312. Such images correspond to the left-hand side of the driver of an automobile upon which the data capture system is mounted.

A sixth image 1212 can be captured by the digital camera 306, a seventh image 1214 may be captured by the digital camera 304, and an eighth image 1216 may be captured by the digital camera 302. Such images correspond to the right-hand side of the driver of the automobile upon which the data capture system is mounted.

A ninth image 1218 may be captured by the digital camera 402 (FIG. 4), which is vertically offset from the digital camera 310. A tenth image 1220 may be captured by a NIR camera that has a substantially similar field of view as the digital camera 402. An eleventh image 1222 may be captured by the digital camera 404, which is vertically offset from the digital camera 304. Similarly, a twelfth image 1224 may be captured by a NIR camera that has a substantially similar field of view as the digital camera 404.

Figure 13:
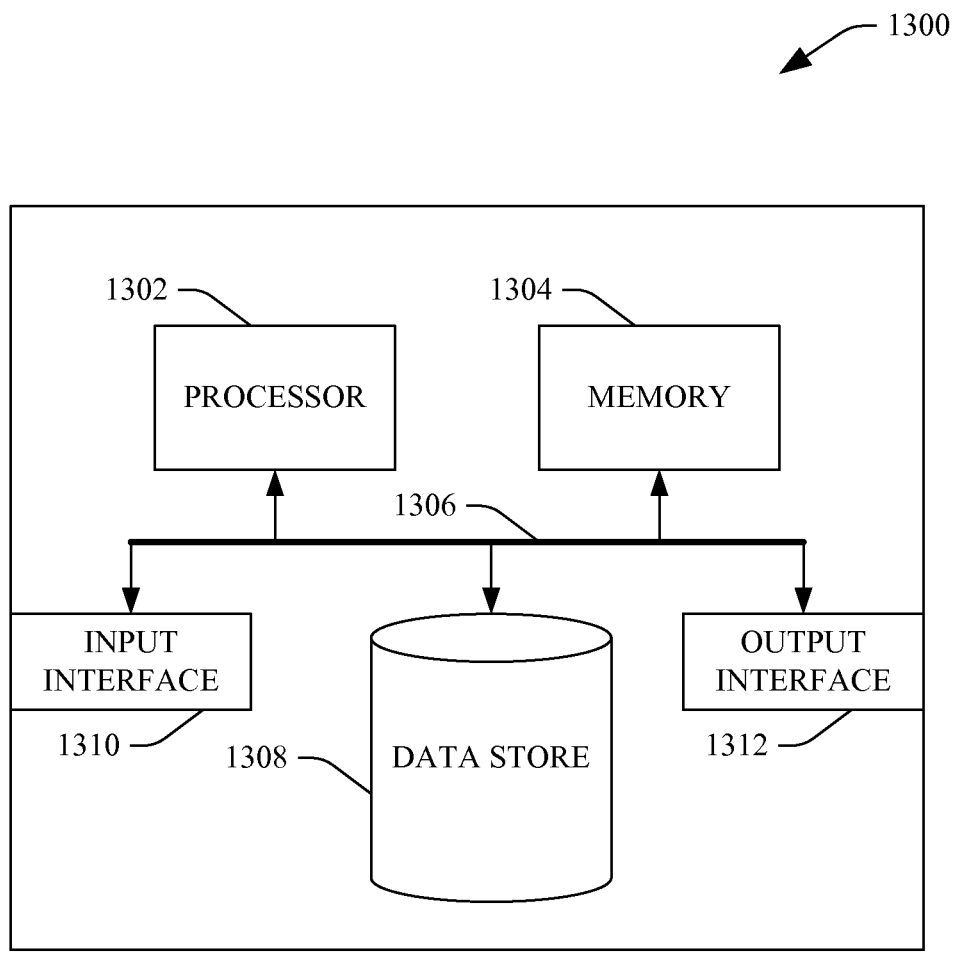
FIG. 13 is an example computing system.

Now referring to FIG. 13, a high-level illustration of an example computing device 1300 that can be used in accordance with the systems and methodologies disclosed herein is illustrated. For instance, the computing device 1300 may be used in a system that supports generating a three-dimensional model of a geographic region. In another example, at least a portion of the computing device 1300 may be used in a system that supports causing a plurality of digital cameras to capture images at a substantially similar point in time. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store images captured by a digital camera, images captured in a NIR camera, data output from a LMS, a GPS receiver, an odometer, an INS, and/or the like.

The computing device 1300 additionally includes a data store 1308 that is accessible by the processor 1302 by way of the system bus 1306. The data store 1308 may include executable instructions, images, data from one or more sensors, etc. The computing device 1300 also includes an input interface 1310 that allows external devices to communicate with the computing device 1300. For instance, the input interface 1310 may be used to receive instructions from an external computer device, images from a digital camera or NIR camera, sensor data from one or more sensors, etc. The computing device 1300 also includes an output interface 1312 that interfaces the computing device 1300 with one or more external devices. For example, the computing device 1300 may display text, images, etc. by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A data collection system for acquiring data for use in constructing three-dimensional models of building facades, the data collection system comprising:
    a housing;
    a digital camera positioned in the housing, the digital camera configured to capture images in a visible light spectrum and having a first field of view;
    a near-infrared camera positioned in the housing, the near-infrared camera configured to capture near infrared images, the near-infrared camera positioned in the housing proximate to the digital camera and having a second field of view, the first field of view and the second field of view are substantially similar;
    a trigger component that is configured to cause the digital camera and the near-infrared camera to capture images synchronously; and
    a mounting mechanism that facilitates mounting the housing to an automobile.

2. The system of claim 1, further comprising an odometer that is mounted to the automobile by way of the mounting mechanism.

3. The system of claim 2, wherein the odometer operates independently of the trigger component.

4. The system of claim 1, wherein the digital camera is configured to capture images from a ground level to between five and ten meters in a vertical direction.

5. The system of claim 4, further comprising a second digital camera that is configured to capture images from between five and ten meters above the ground and twenty three and twenty eight meters in the vertical direction.

6. The data collection system of claim 1, further comprising a laser measurement system that is configured to determine a distance between the laser measurement system and an object, the laser measurement system is in communication with the trigger component such that the trigger component generates a timestamp that corresponds to a data packet output by the laser measurement system, the data packet output by the laser measurement system comprising the distance between the laser measurement system and the object, and wherein the laser measurement system is mounted to the automobile by way of the mounting mechanism.

7. The system of claim 1, further comprising a GPS receiver that is configured to determine a current position of the system, the GPS receiver is in communication with the trigger component such that the trigger component generates timestamps for data packets output by the GPS receiver, and the GPS receiver is mounted to the automobile by way of the mounting mechanism.

8. The system of claim 1, further comprising an inertial navigation system that is configured to output data indicative of at least one of an acceleration of the automobile or angular velocity of the automobile, wherein the inertial navigation system is in communication with the trigger component such that the trigger component generates timestamps for data packets output by the inertial navigation system, and wherein the inertial navigation system is mounted to the automobile by way of the mounting mechanism.

9. The system of claim 1, the housing being a carbon fiber housing.

10. The system of claim 1, the housing being a panoramic head that comprises a plurality of other digital cameras.

11. The system of claim 1, further comprising: a panoramic head that comprises a plurality of digital cameras, wherein the panoramic head is vertically offset from the digital camera and the near infrared camera by a distance between 0.5 meters and 1.5 meters.

12. The system of claim 1, further comprising:
    a first laser measurement system that is configured to scan in a vertical direction; and
    a second laser measurement system that is configured to scan in a horizontal direction, the first and second laser measurement systems configured to generate scans responsive to receipt of a trigger signal from the trigger component, the first and second laser measurement systems are mounted to the automobile by way of the mounting mechanism, and the first and second laser measurement systems output respective distances between the first and second laser measurement systems and building facades.

13. The system of claim 1, further comprising a data repository in communication with the digital camera and the near infrared camera, the data repository retains images output by the digital camera and the near-infrared camera.

14. A method that facilitates capturing three-dimensional image data, the method comprising:
    capturing, with a digital camera positioned in a housing that is mounted to an automobile, a first image of a facade of a building;
    capturing, with a near infrared camera that is positioned in the housing proximate to the digital camera, a second image of the facade of the building, an optical axis of the digital camera is aligned with the optical axis of the near infrared camera, the digital camera and the near infrared camera have substantially similar fields of view when respectively capturing the first image of the facade of the building and the second image of the facade of the building;

capturing, with a laser measurement system mounted to the automobile, a distance between the laser measurement system and the facade of the building; and constructing a computer-implemented three-dimensional model of the building based upon the first image of the facade of the building, the second image of the facade of the building, and the distance between the laser measurement system and the facade of the building, the constructing performed by a processor of a computing device.

15. The method of claim 14, wherein the digital camera and the near infrared camera receive respective trigger signals that cause the digital camera and the near infrared camera to simultaneously capture the first image and the second image, respectively.

16. The method of claim 14, further comprising capturing, with a GPS sensor, a geographic location of the automobile when the first image and the second image are captured, and wherein the computer-implemented three-dimensional model of the building is constructed based upon the geographic location of the automobile.

17. The method of claim 14, wherein the housing is a panoramic head.

18. The method of claim 14, further comprising capturing, with an inertial navigation system mounted on the automobile, at least one of an acceleration of the automobile or an angular velocity of the automobile when the first image and the second are captured, and wherein the computer-implemented three-dimensional model of the building is constructed based upon the at least one of the acceleration of the automobile or the angular velocity of the automobile.

19. The method of claim 14, further comprising capturing, with another digital camera mounted on the automobile, a third image, wherein the another digital camera is caused to capture the third image simultaneously with the near infrared camera capturing the second image, and wherein the another digital camera is vertically disposed from the digital camera.

20. A data capture system that facilitates capture of three-dimensional data, comprising:

a panoramic head that includes a plurality of digital cameras, a field of view of the plurality of digital cameras is collectively a panoramic view;

a digital camera pair that is vertically offset from the panoramic head;

a plurality of laser measurement systems that are configured to output respective distances between the data capture system and one or more building facades; and a near infrared camera that is positioned proximate to at least one digital camera in the panoramic head, such that the near infrared camera and the at least one digital camera have substantially similar fields of view, the digital cameras in the panoramic head, the digital camera pair, and the near infrared camera are configured to capture images synchronously.

* * * * *